United States Patent [19]
Schivley

[11] Patent Number: 5,818,951
[45] Date of Patent: Oct. 6, 1998

[54] METHODS AND RELATED APPARATUS FOR GENERATING THERMOGRAPHIC SURVEY IMAGES

[75] Inventor: James Dale Schivley, Orlando, Fla.

[73] Assignee: Infrared Service Corporation, Orlando, Fla.

[21] Appl. No.: 543,189

[22] Filed: Oct. 13, 1995

[51] Int. Cl.$^6$ .................................. G06K 9/00; G06K 9/03
[52] U.S. Cl. ........................ 382/100; 382/311; 364/64; 364/164; 364/184; 358/183
[58] Field of Search .......................... 348/32, 144, 164, 348/184, 64, 25, 29; 382/270, 284, 294, 298, 311, 100; 395/135, 133; 358/183, 139

[56] References Cited

U.S. PATENT DOCUMENTS

| | | | |
|---|---|---|---|
| 2,758,298 | 8/1956 | Sunstein . | |
| 3,076,189 | 1/1963 | Goddard . | |
| 3,752,915 | 8/1973 | Parker | 178/187 |
| 4,590,607 | 5/1986 | Kauth | 382/41 |
| 4,910,593 | 3/1990 | Weil | 358/93 |
| 4,912,770 | 3/1990 | Seto et al. | 382/17 |
| 4,967,276 | 10/1990 | Murakami et al. | 358/183 |
| 5,027,422 | 6/1991 | Peregrim et al. | 382/48 |
| 5,045,937 | 9/1991 | Myrick | 358/109 |
| 5,054,097 | 10/1991 | Flinois | 382/44 |
| 5,133,605 | 7/1992 | Nakamura | 374/124 |
| 5,166,789 | 11/1992 | Myrick | 358/109 |
| 5,173,949 | 12/1992 | Peregrim et al. | 382/48 |
| 5,185,808 | 2/1993 | Cok | 382/1 |
| 5,293,469 | 3/1994 | Outa et al. | 395/133 |
| 5,343,410 | 8/1994 | Tsujiuchi et al. | 364/525 |
| 5,351,307 | 9/1994 | Prejean-Lefevre | 382/8 |
| 5,357,601 | 10/1994 | Kagawa | 395/135 |
| 5,377,314 | 12/1994 | Bates et al. | 395/135 |
| 5,388,192 | 2/1995 | Ohsawa et al. | 395/135 |
| 5,394,520 | 2/1995 | Hall | 395/135 |
| 5,414,462 | 5/1995 | Veatch | 348/64 |
| 5,434,614 | 7/1995 | Dainty | 348/64 |
| 5,557,260 | 9/1996 | Legaz | 348/164 |

OTHER PUBLICATIONS

*ER Mapper 5.0* Applications Guide, Earth Resource Mapping.
ER Mapper 5.0 Application Guide.
M. Pavel, *Sensor Fusion for Synthetic Vision*, AIAA Conference "Computing on Aerospace 8" Baltimore MD, Oct. 21–24, 1991.

*Primary Examiner*—Dwayne Bost
*Assistant Examiner*—Brian L. Johnson
*Attorney, Agent, or Firm*—Allen, Dyer, Doppelt, Milbrath & Gilchrist, P.A.

[57] ABSTRACT

A method for generating a thermographic output survey image, such as for a building roof moisture survey or concrete delamination survey, using a processor and a display screen operatively connected thereto includes the steps of: obtaining an aerial thermographic survey image and an aerial visual image of a survey area; loading the thermographic and visual images into the processor; displaying on the display screen the thermographic image superimposed on the visual image; selectively reducing an opacity of the displayed thermographic survey image to reveal visible features of the underlying displayed visual image; and observing and selectively removing false anomaly thermographic image portions from the displayed thermographic survey image based upon features of the underlying visual image to thereby generate an accurate and high quality output thermographic survey image. If a hard copy of the output survey image is desired, the method may also include the step of printing the output thermographic survey image. Apparatus aspects of the invention are also disclosed.

39 Claims, 9 Drawing Sheets

METHODS AND RELATED APPARATUS FOR GENERATING THERMOGRAPHIC SURVEY IMAGES

FIELD OF THE INVENTION

The present invention relates to the field of surveys and testing, and, more particularly, to methods and apparatus for facilitating generation of output survey images.

BACKGROUND OF THE INVENTION

Various imaging techniques are used to perform non-destructive testing or surveying of both manmade and natural areas and objects. Thermal imaging or thermography, in particular, has proved valuable for a number of applications. For example, thermography can be used to determine a leakage path associated with landfills or other disposal or liquid storage facilities based upon temperature differences between surrounding soil and liquid.

In addition, thermography can be used to determine defects in a manmade structure, such as a building roof or bridge. For example, a building roof may be damaged or deteriorated such that it leaks or otherwise admits undesirable quantities of moisture. A thermographic image of the building roof can be used to indicate such problem areas requiring further maintenance or analysis.

One conventional approach to conducting a roof moisture survey requires obtaining thermographic survey images of the roof, as may be readily obtained using a conventional Forward Looking Infrared Radar (FLIR) camera operated from a moving airplane. The thermographic survey image is preferably taken as the sun is setting and the roof begins to cool. Those roof areas laden with moisture will cool more slowly than the surrounding roof portions. Accordingly, the moisture problem areas will appear as hot spots on the thermographic survey image.

More particularly, a nearly vertically oriented thermographic survey image is generated by grabbing a frame from the infrared videotape. The information or data contained in the thermal image is then painstakingly and manually read, interpreted and transferred by a skilled technician onto a suitable blueprint or photograph of the building roof.

Accordingly, the technician may ultimately produce an output survey image or map relating to and indicating the moisture problem areas overlying the photograph or blueprint of the building roof.

Unfortunately, the conventional brute force manual approach requires considerable skill, patience, experience and time to develop a meaningful output that can be used by architects or maintenance personnel to assess and correct any moisture problems. In addition, the technician must decide the threshold or cutoff thermal intensity which indicates the presence of moisture. Accordingly, high accuracy may be difficult to obtain. The technician must also painstaking weed out any false thermal anomalies caused by ponded water, leaves, etc. on the roof. The presence of false thermal anomalies in the output survey greatly compromises the overall quality and usefulness of the output survey map.

Another area where thermal imaging as a form of non-destructive testing may be used is in surveying concrete structures for areas of delamination as disclosed, for example, in U.S. Pat. No. 4,910,593 to Weil entitled "System for Geological Defect Detection Utilizing Composite Video-Infrared Thermography". In other words, as a concrete structure like a bridge ages it may suffer from internal delaminations of the concrete. It is important for safety and to reduce maintenance costs to determine the extent and location of any such delaminations. A bridge may alternately be tested by sounding wherein a large chain is dropped upon the bridge roadway and acoustic readings taken to obtain data concerning delaminations. Unfortunately, such a procedure is labor intensive and requires closing of the bridge. In addition, the accuracy may be less than desired.

Thermal imaging of the bridge roadway, for example, allows a thermographic image to be generated which indicates internal pockets or delaminations by their different thermal characteristics. A thermal image taken at midmorning, for example, will indicate the delaminations as hot spots, while the surrounding bridge portions are cooler. Unfortunately, manual thermographic image processing techniques may be extremely time consuming and subject to possible errors.

These are several approaches to combining thermographic survey images with a visible image. For example, U.S. Pat. No. 4,967,276 to Murakami et al. Entitled "Video Signal Mixing Device for Infrared/Visible Integrated Imaging" discloses an apparatus including a visual camera and an infrared camera directed to the same object or area. A video signal mixer superimposes a video signal produced by the visible camera, upon an infrared video signal produced by the infrared camera. The levels of the infrared and visible video signals are adjustable independently. Unfortunately such a system may not produce acceptable resolution and quality as required for many aerial surveying applications. Moreover, coordination and precise alignment of the two cameras may be difficult to achieve.

U.S. Pat. No. 5,045,937 to Myrick and entitled "Geographical Surveying Using Multiple Cameras to Obtain Split-Screen Images with Overlaid Geographical Coordinates" discloses an earth surveying system including two color video cameras and an infrared imaging head carried in a pod on an aircraft. The infrared data processor produces a master composite sync signal to which the two video cameras are slaved. The video signal from the normal field of view camera and the color television signal from the infrared data processor are fed to a special effects generator which produces a split screen in which an upper portion displays the color infrared image of a forward frame and the lower portion displays the color video imaged from the video camera of the following portion of that frame. The split screen technique permits playback of the recorded images to allow any anomaly appearing in the forward infrared portion of a frame to be tracked into the color vide portion of a following frame. Altitude and GPS data may be connected to superimpose latitude and longitude readings and altitude readings on the video recordings of the surveyed areas. In operation of the system, the operator adjust the temperature range of the infrared data processor in accordance with the mission.

U.S. Pat. No. 5,133,605 to Nakamura entitled "Monitoring System Employing Infrared Image" discloses an infrared monitoring system including an infrared camera and a visible light camera both viewing the same scene to be monitored, such as a power station transformer. The output of the visible light camera is superposed over the temperature pattern of the scene measured with the infrared cameras, so that an area having a refection of sun light is deleted from the data of the temperature pattern. The temperature monitoring system is thus less likely to obtain an erroneous reading caused by a reflection of sunlight, such as from a power station transformer.

Also relating to thermal and visual imaging using cameras having common areas of focus, is U.S. Pat. No. 4,910,593 to Weil discussed briefly above. The patent discloses a system wherein visual and infrared images are simultaneously successively recorded on videotape together with related location data and other relevant information. Video recorded infrared, video and location data are selectively captured on successive frames and such frames are recorded for further analysis. Unfortunately, the dual camera approach may be difficult to coordinate. Moreover, the preferred time for a thermographic survey may not correspond to the preferred time for visible images. In addition, processing of the images once obtained may still be difficult and time consuming.

SUMMARY OF THE INVENTION

In view of the foregoing background, it is therefore an object of the present invention to provide a method and apparatus to facilitate generation of a high quality and high accuracy output thermographic survey image.

It is another object of the invention to provide a method and apparatus for facilitating generation of an accurate, high quality output roof moisture survey image.

It is yet another object of the invention to provide a method and apparatus for facilitating generation of an accurate, high quality output concrete delamination survey image.

These and other objects, features and advantages of the present invention are provided by a method for generating a thermographic output survey image using a processor and a display screen operatively connected thereto. In one embodiment of the invention, the method preferably comprises the steps of: obtaining an aerial thermographic survey image and an aerial visual image of a survey area; loading the thermographic and visual images into the processor; displaying on the display screen the thermographic image superimposed on the visual image; selectively reducing an opacity of the displayed thermographic survey image to reveal visible features of the underlying displayed visual image; and observing and selectively removing false anomaly thermographic image portions from the displayed thermographic survey image based upon features of the underlying visual image to thereby generate an accurate and high quality output thermographic survey image. For example, for a thermographic roof moisture study, the false anomalies produced by ponded water, leaves, etc. may be readily removed by a technician.

If a hard copy of the output survey image is desired, the method may also include the step of printing the output thermographic survey image. Accordingly, the thermographic survey image may be quickly and easily processed by a technician to generate a high quality output thermographic survey image using the processor and display screen in accordance with the invention.

The displayed survey image preferably includes a plurality of pixels. Accordingly, another aspect of the invention is that an intensity histogram may be generated based upon the intensity of the plurality of pixels of the displayed survey image; and the technician may select only those pixels having an intensity above a threshold to be displayed on the display screen. For example, the threshold may be set to reveal thermographic anomalies, such as moisture accumulation in a building roof, or concrete delaminations in a concrete structure, such as a bridge deck.

Where the survey area is a building roof and moisture is being assessed, the method further preferably comprises the steps of conducting roof core sample tests, and adding to the output thermographic survey image indicia relating to the core sample tests. The tests further support the accuracy and provide additional information important to the user.

Because of the versatility of the processor and display approach of the present invention, other types of survey images may be obtained, and processed to produce a survey based upon different types of surveys. For example, in testing a geographic area for leaks, both thermographic and ground penetrating radar information may be readily processed to produce a more comprehensive output survey image. For a roof moisture survey, nuclear moisture testing may be added to the output thermographic survey image.

The method may further comprise the step of converting the aerial survey image and the aerial visual image into respective image data. For certain types of tests or surveys, the method may also include the step of inverting the displayed survey image so that for a thermographic image of a building roof, for example, lighter intensities may be made to represent hotter areas.

Other useful techniques are also readily included in the method according to the invention. For example, the step of obtaining a survey image of the survey area may comprise taking an aerial forward looking infrared radar (FLIR) videotape of the survey area and selecting a frame from the videotape at a substantially vertical relationship to the survey area. The method may also include the step of adding color to the survey image.

The step of obtaining a visual image of the survey area may preferably include taking an aerial photograph of the survey area. In addition, the aerial photograph may be readily digitized and stored in digital format on a CDROM. In an alternate embodiment, the visual image may be provided by a blueprint or computer aided design (CAD) drawing of the survey area, such as a building.

The method may also further comprise the step of adding indicia to the output survey image. Such indicia may include legends, scales, core test data, and other information so that the output survey image contains desired information in a simple to read and readily understood format.

The apparatus according to the invention may preferably comprise a processor and a display screen operatively connected thereto. The processor preferably includes loading means for permitting loading respective image data of the aerial thermographic survey image and the aerial visual image; displaying means for displaying on the display screen the aerial thermographic survey image superimposed on the visual image; and opacity control and edit means for permitting viewing the underlying visual image and selectively removing false anomaly thermographic image portions.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 2:
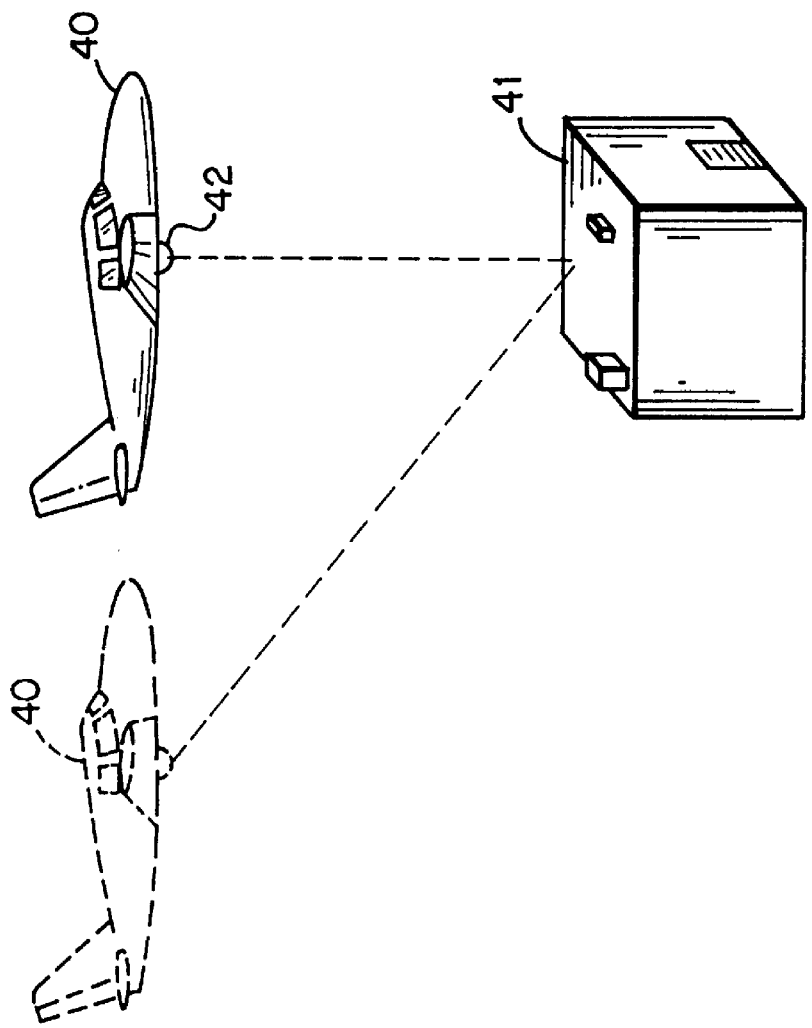
FIG. 2 is a schematic side perspective view of the step of obtaining a thermographic survey image of a survey area in accordance with the present invention.
Figure 1:
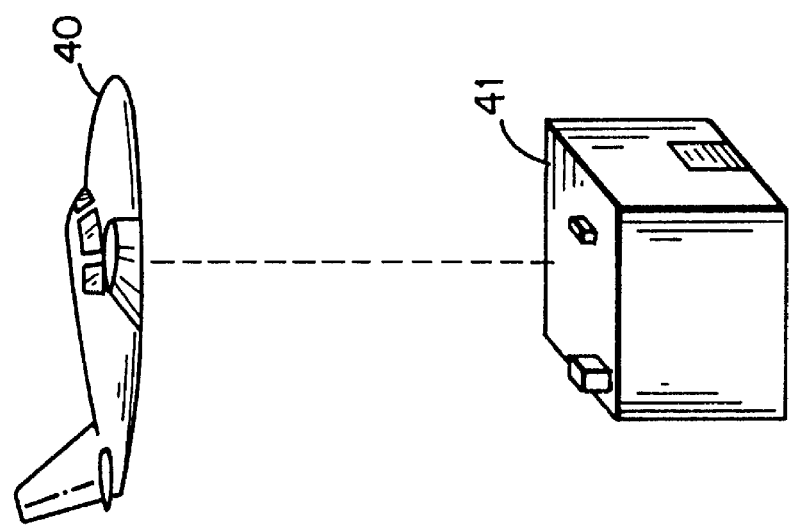
FIG. 1 is a schematic side perspective view of the step of obtaining a visual image of a survey area in accordance with the present invention.
Figure 3:
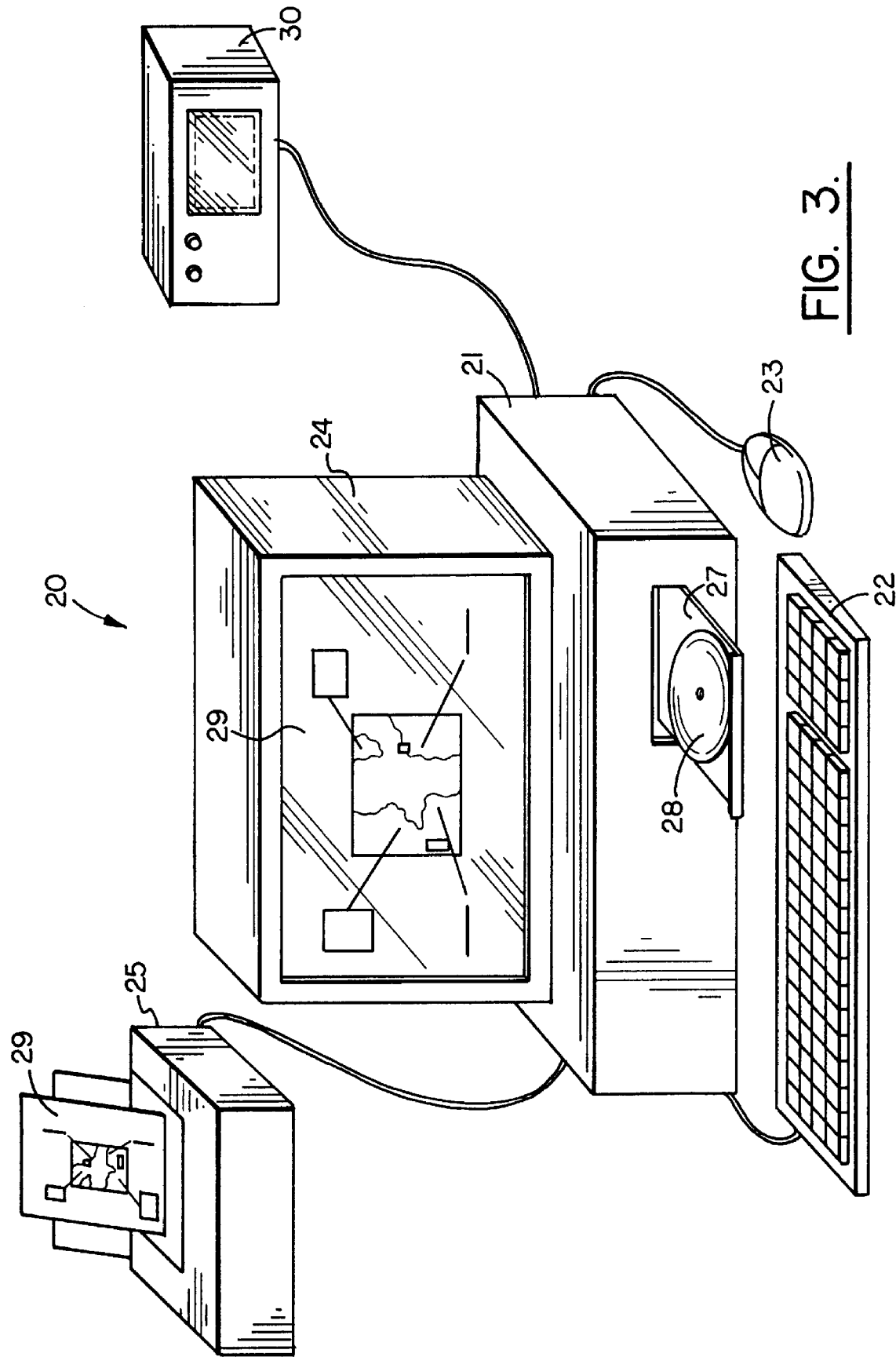
FIG. 3 is a schematic perspective view of a portion of the apparatus used in accordance with the present invention.

Referring initially to FIGS. 1–3 the apparatus 20 and method according to the invention is first generally explained. The present invention is directed to a method for generating a thermographic output survey image 29 using a processor and a display screen 24 operatively connected thereto. The processor may be provided by a computer 21 as illustrated in FIG. 3 along with its associated keyboard 22, mouse 23, and color printer 2S. As will be described in greater detail below, the computer preferably includes an optical disk drive 27 as would be readily understood by those skilled in the art. A videotape player 30 may also be connected to the computer as also described in greater detail below.

In one embodiment of the invention, the method preferably comprises the steps of: obtaining an aerial thermographic survey image and an aerial visual image of a survey area; loading the thermographic and visual images into the illustrated computer 21; displaying on the display screen 24 the thermographic image superimposed on the visual image; selectively reducing an opacity of the displayed thermographic survey image to reveal visible features of the underlying displayed visual image; and observing and selectively removing false anomaly thermographic image portions from the displayed thermographic survey image based upon features of the underlying visual image to thereby generate an output thermographic survey image 29. For example, for a thermographic roof moisture study, the false anomalies produced by ponded water, leaves, etc. may be readily removed by the technician as described in greater detail below.

Considered in somewhat different terms, the apparatus 20 preferably includes the processor or computer 21 and its associated display 24. The processor 21 preferably includes loading means for permitting loading respective image data of the aerial thermographic survey image and the aerial visual image; displaying means for displaying on the display screen 24 the aerial thermographic survey image superimposed on the visual image; and opacity control and edit means for permitting viewing the underlying visual image and selectively removing false anomaly thermographic image portions.

Several commercially available image processing software programs may be helpful in carrying out the present invention once loaded into the computer 21 as would be readily understood by those skilled in the art. For example, Adobe Photoshop™ version 2.5 for Windows™ available from Adobe Systems Incorporated of Mountain View, Calif., and ER Mapper 5.0 from Earth Resource Mapping in San Diego, Calif. may be useful.

The aerial visual image may be a high quality daytime photograph obtained as schematically illustrated in FIG. 1 wherein an airplane 40 overflies the building roof 41 being surveyed. In addition, the aerial photograph may be readily digitized and stored in digital format on the illustrated CDROM 28. In an alternate embodiment, the visual image may be provided by a blueprint or computer aided design (CAD) drawing of the survey area, such as a building, bridge or other structure or geographic feature.

In addition, the step of obtaining a thermographic survey image of the survey area may comprise taking an aerial forward looking infrared radar (FLIR) videotape of the survey area and selecting a frame from the videotape at a substantially vertical relationship to the survey area as illustrated schematically in FIG. 2. The FLIR videotape may be obtained using a conventional FLIR camera 42, such as an Inframetrics Model IRTV-445 MKII Stabilized Gimbal Aerial Sensor mounted to the fuselage of the airplane 40 as illustrated. The video recorder and monitor may be positioned within the airplane and operated by a technician as would be readily understood by those skilled in the art. The video recorder 30 may be used to input the thermographic survey image into the memory of the computer 21 as would also be readily understood by those skilled in the art.

Other means of obtaining overhead thermographic survey and visual images are also contemplated by the present invention. Airplane and other aircraft flyovers are particularly well suited for roof moisture surveys and concrete structure delamination surveys.

If a hard copy output thermographic survey image 29 is desired, the method may also include the step of printing the output thermographic survey image using a conventional high quality color printer 25. Accordingly, the thermographic survey image may be quickly and easily processed by a technician to generate a high quality output survey image using the processor 21 and display screen 24 in accordance with the invention.

One particularly important aspect of the present invention is for roof moisture surveys. Water introduced into a roof system quickly results in many problems for both the occupier and the building owner. Moisture may contribute to the degradation of the roof membrane, rusting of the metal decks and fasteners, overloading of the roof's supporting structure, and excessive energy consumption due to the reduced thermal efficiency of the insulation. Accordingly, accurate and effective thermographic survey imaging may be crucial for building maintenance and prolonging the life of the roof, as well as being useful in assessing the value of the building.

Another significant embodiment or aspect of the present invention is in conducting concrete structure delamination surveys using the thermographic survey image analysis and processing as described herein. As would be readily understood by those skilled in the art, other potential applications of the present invention may include thermographic surveys to detect gas pipeline leaks, determine electric power transmission line problems, examine population density, assist in search and rescue missions, conduct pollution studies, and conduct timber surveys.

Figure 4A:
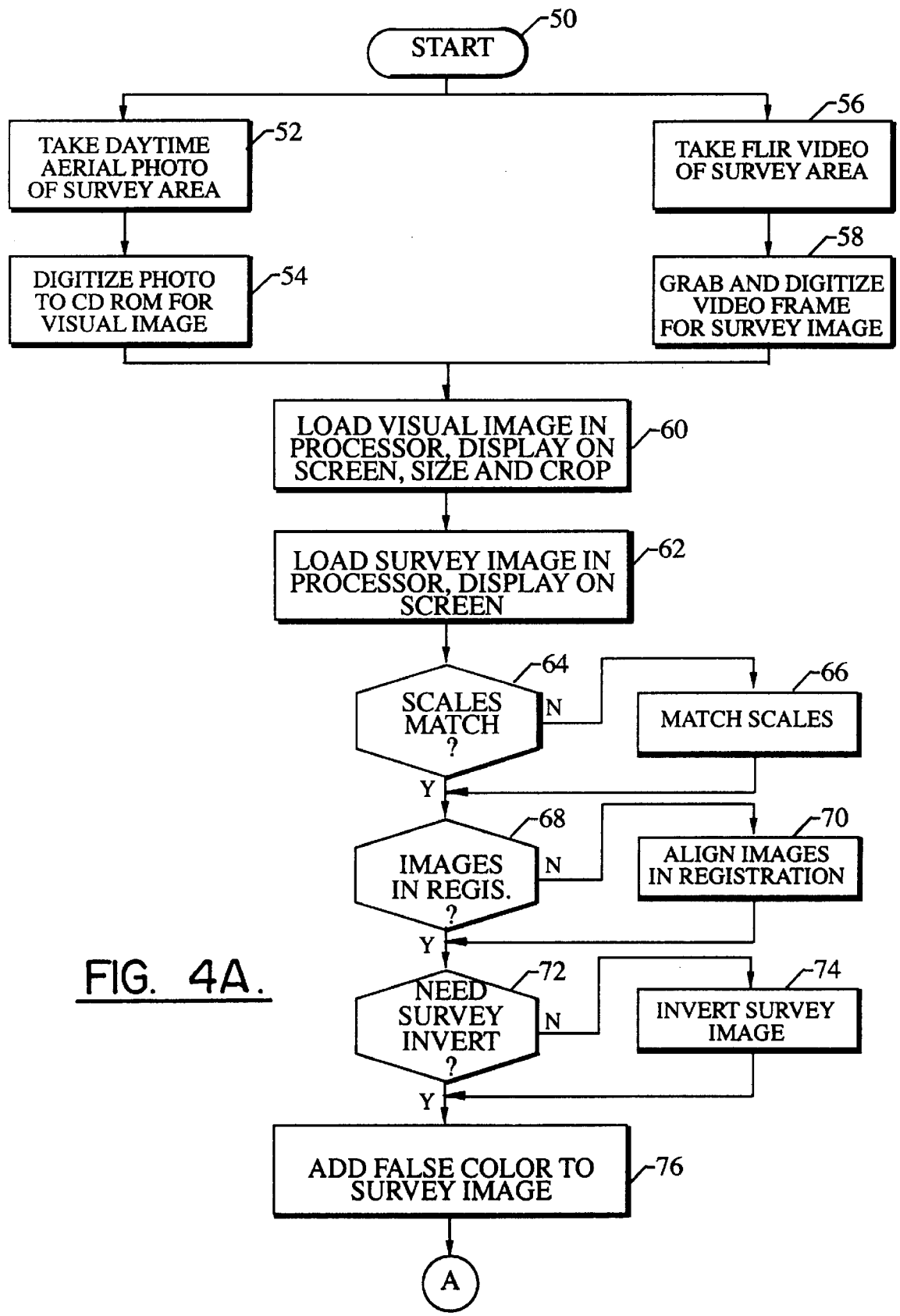
FIG. 4A is a first portion of a flowchart describing the method steps in accordance with the present invention.
Figure 4B:
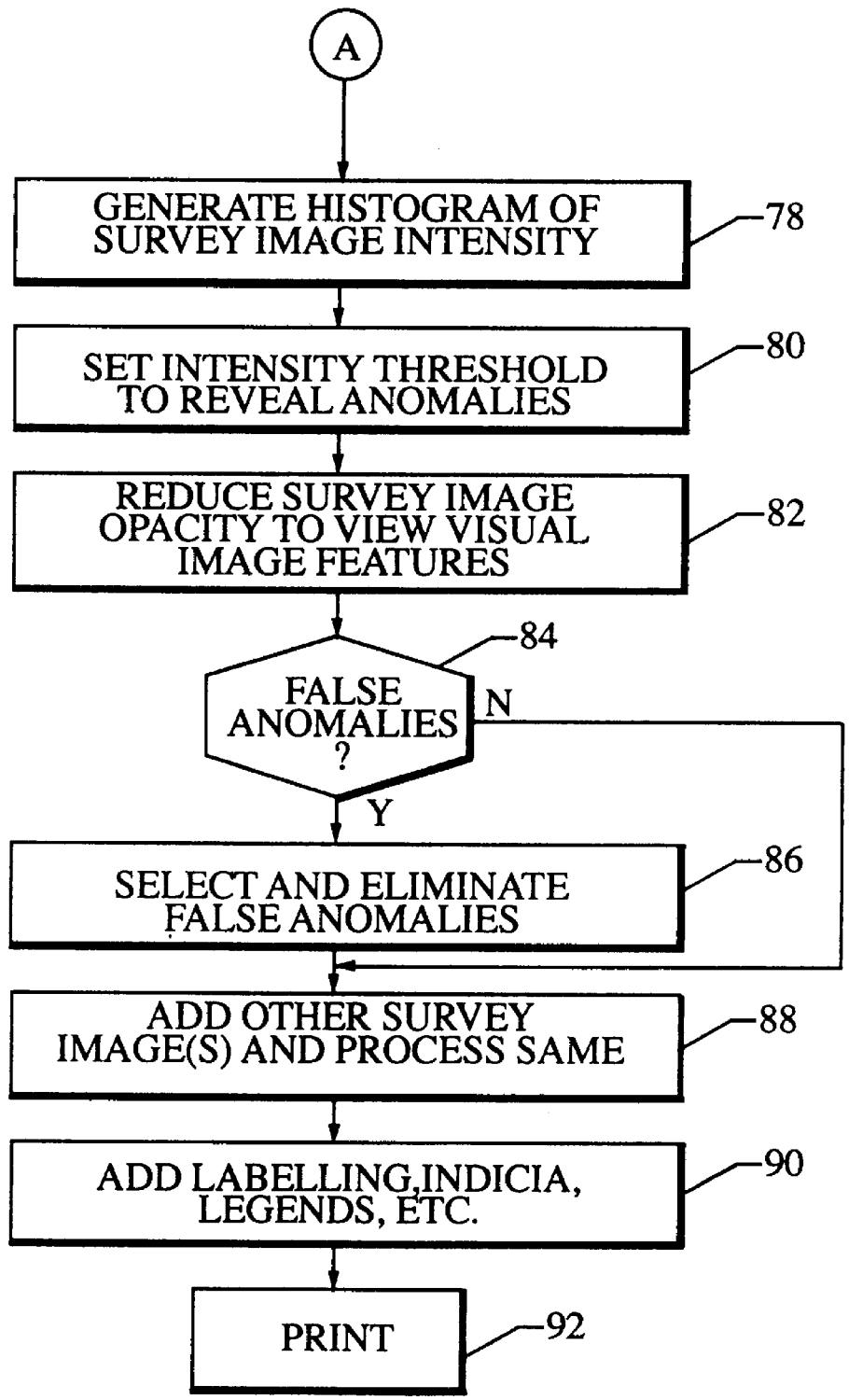
FIG. 4B is a second portion of a flowchart describing the method steps in accordance with the present invention.

Referring now to the flowchart of FIGS. 4A and 4B, the method according to the invention is further described with reference primarily to conducting a thermographic building roof moisture survey. After starting (Block 50), at Block 52, a daytime high resolution aerial photograph of the building to be surveyed is taken. As would be readily understood by those skilled in the art, the photograph may be readily digitized and the digital image data stored on a CDROM 28 at Block 52.

A FLIR camera is used to produce a thermal image videotape at Block 56, and frame from a nearly vertical position is grabbed and digitized at Block 58. Both the thermographic survey image and the visual image are loaded into the processor at Blocks 60, 62, respectively. If the image scales do not match at Block 64, the scales are matched by the technician at Block 66. After matching of scales, the registration of images is checked at Block 68. If the images are not in registration, the images are aligned in registration by selecting predetermined points, such as building corner points, and the images aligned (Block 70) as would be readily understood by those skilled in the art.

For certain applications, such as a typical roof moisture survey, it may be desirable to invert the thermographic image (Blocks 72, 74) so that black is the hotter temperature. In addition, a clearly distinguishable false color, such as red, for example, may be added to the thermographic survey image at Block 76.

At Blocks 78, 80 a temperature or intensity histogram of thermographic image pixels may be selected and examined by the technician to determine and set a threshold to remove those portions not indicative of thermal anomalies as would be readily appreciated by those skilled in the art.

At Block 82 the opacity of the displayed thermographic survey image is reduce to permit the technician to view features of the underlying visual image. The technician may then determine at Block 84 whether there are any false anomalies, such as may be caused by ponded water, leaves, etc. as would be readily understood by those skilled in the art. The technician may electronically select and remove or edit the false anomalies from the displayed thermographic survey image at Block 86.

At Block 88 other types of surveys or test data may be processed analyzed and added to the thermographic survey image. For example, core moisture samples may be taken from portions of the roof and the results of such superimposed on the output survey image. In addition, nuclear capacitance moisture data may also be taken and added as would be readily understood by those skilled in the art. Relating to surveys of geographical features in particular, ground penetrating radar sensing may also be used and combined in the output thermographic survey image as would be readily understood by those skilled in the art.

Moreover, various labelling, legends, and other identifying or summary indicia may be added at Block 90. The thus produced thermographic survey image and other survey information may be printed if desired (Block 92).

Figure 5:
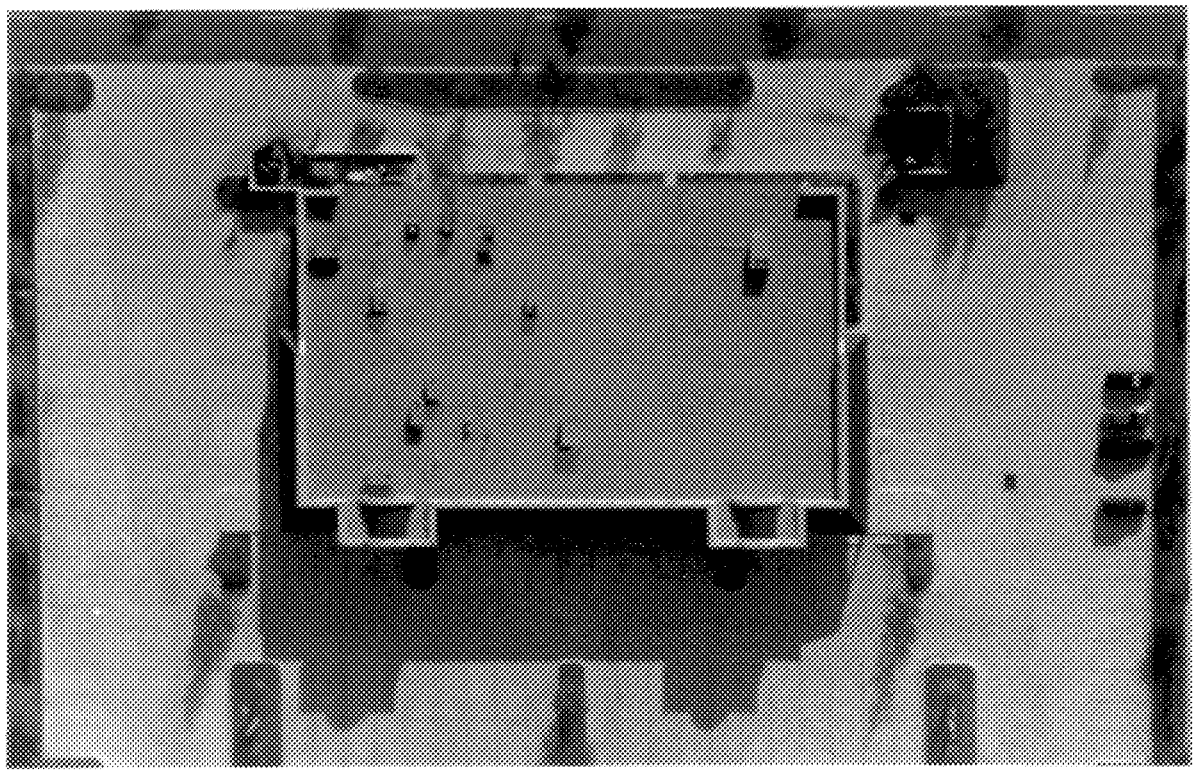
FIGS. 5–11 are visual and thermographic survey images illustrating the method in accordance with the present invention.
Figure 6:
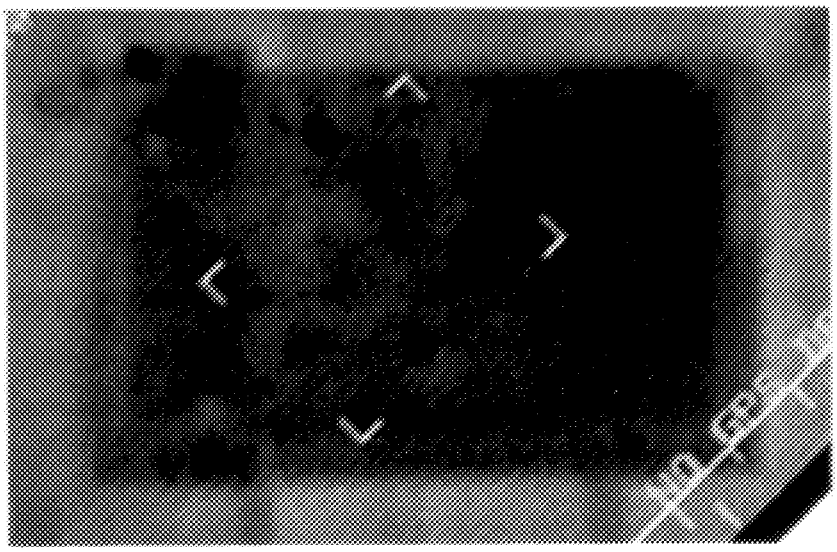
Figure 7:
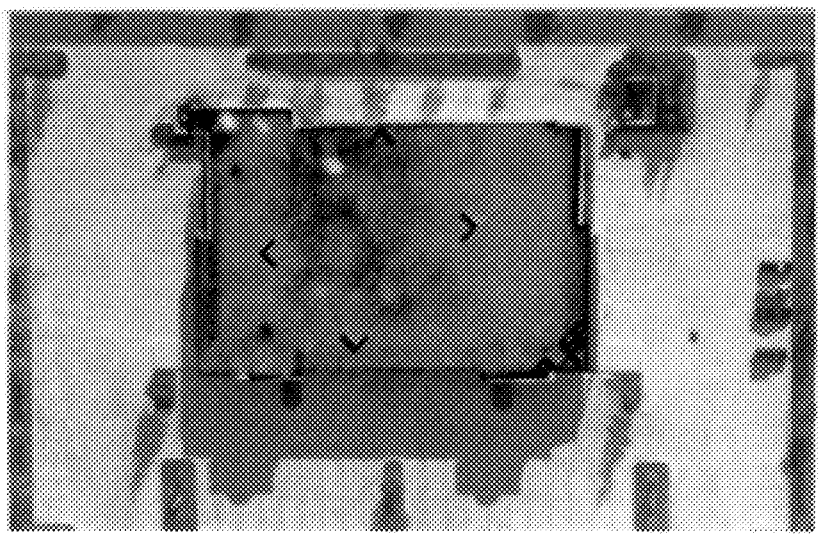
Figure 8:
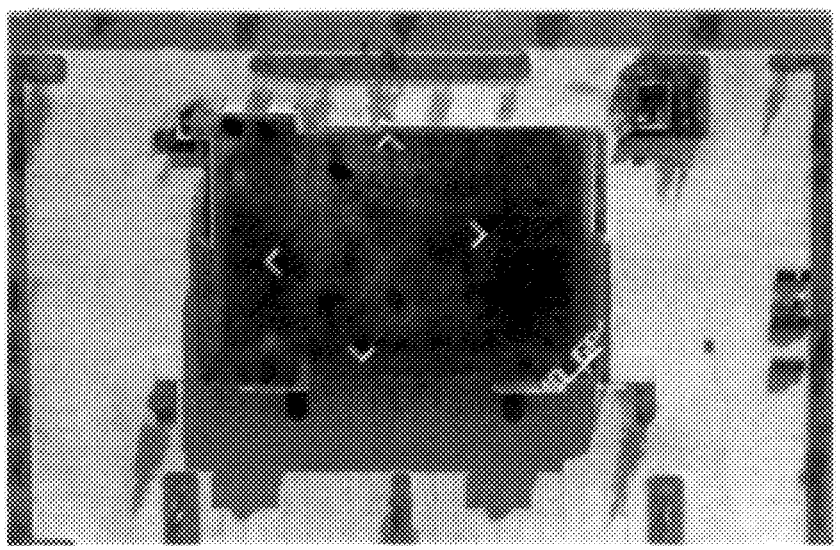

Turning now additionally to FIGS. 5–13 various intermediate stages and outputs in accordance with the invention are shown and further described. As would be readily understood by those skilled in the art, the output images are preferably in color; however, the black and white images are also illustrative of the present invention. FIG. 5 is a visual image of a surveyed building roof as produced from CDROM digitized data and as printed on a printer. FIG. 6 illustrates initial positioning of the thermographic survey image over the visual image. FIG. 7 illustrates registration of the thermographic and visual images. The image of FIG. 8 was produced by inverting the thermographic survey image.

Figure 9:
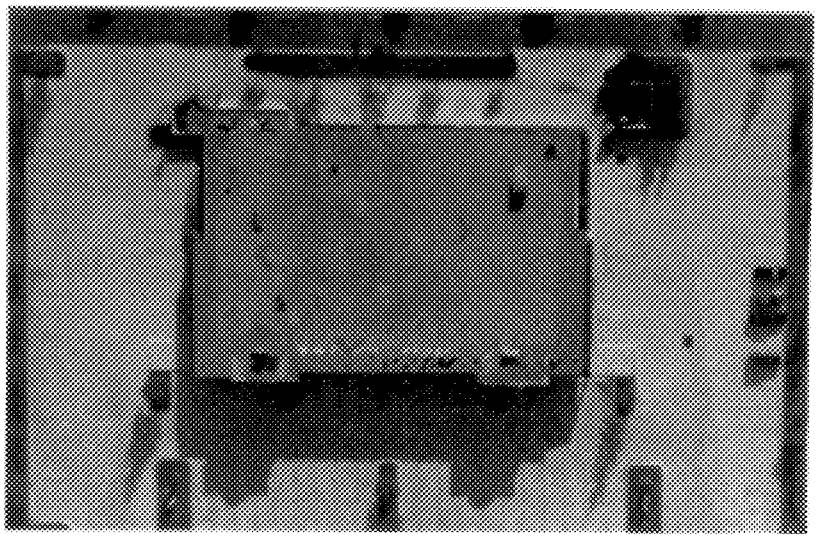
Figure 10:
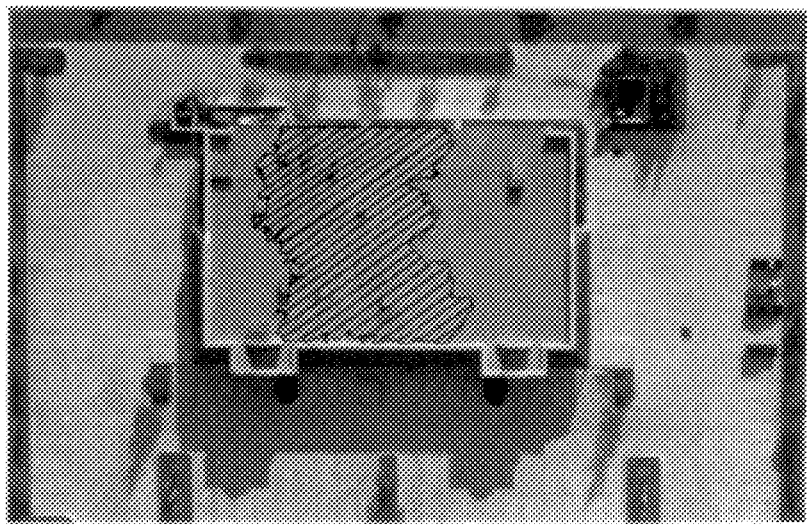
Figure 11:
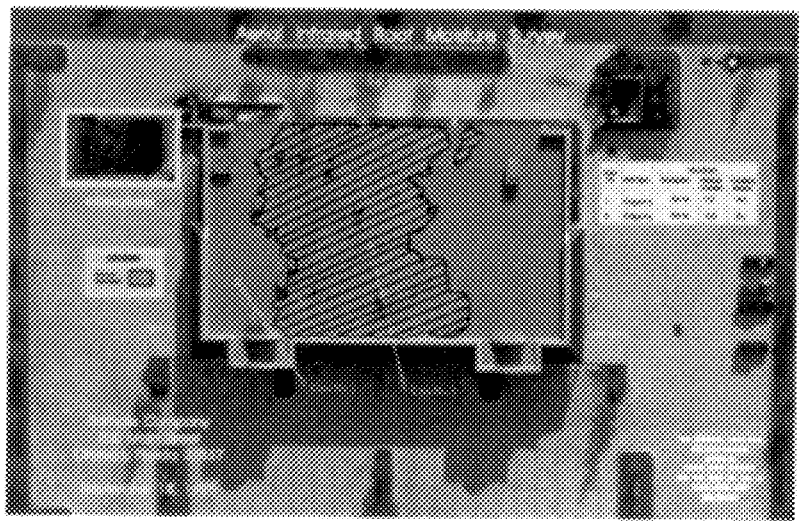

FIG. 9 illustrates the thermographic survey image after thresholding the data to reveal only thermal anomalies. FIG. 10 is an image illustrating removal of false anomaly areas with the remaining anomalies highlighted by cross-hatching. FIG. 11 is similar to FIG. 10, but with various indicia added thereto. In particular, the upper left hand portion illustrates the enlarged portion of the thermographic survey image thereby providing more specific and further useful information.

Figure 12:
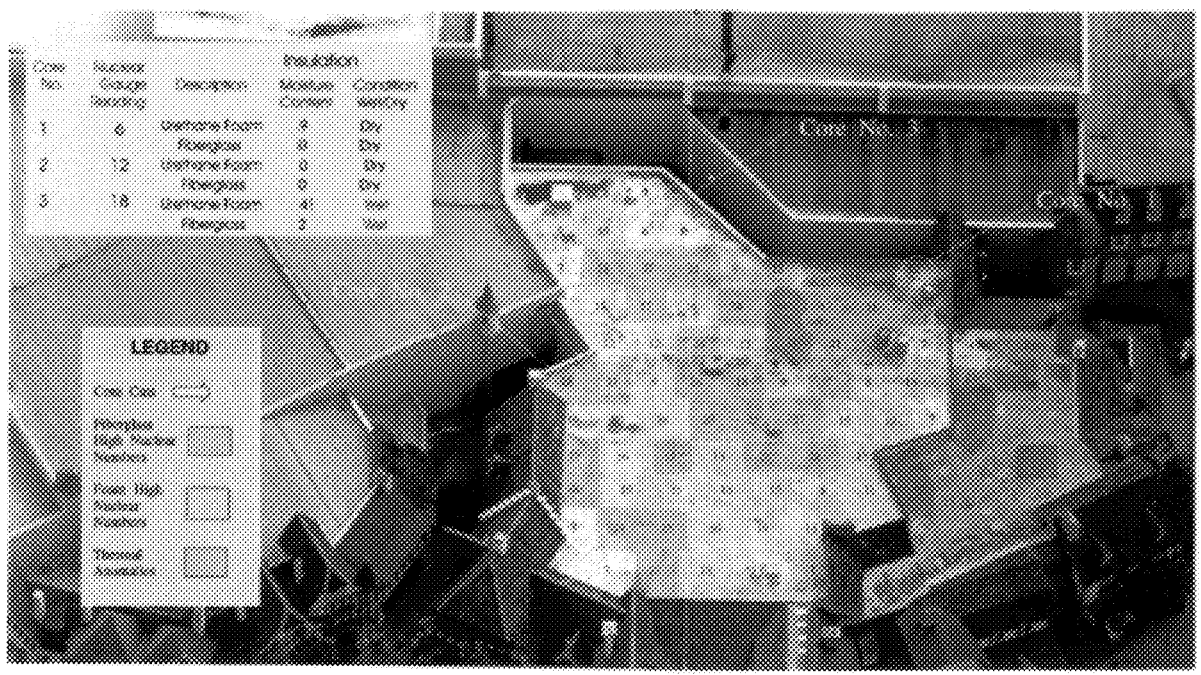
FIG. 12 is an output aerial building roof moisture survey image in accordance with the present invention.

FIG. 12 is a sample output thermographic roof moisture survey image further showing the inclusion of nuclear moisture test information graphically included. The thermal anomaly areas are further indicated by cross-hatching.

Figure 13:
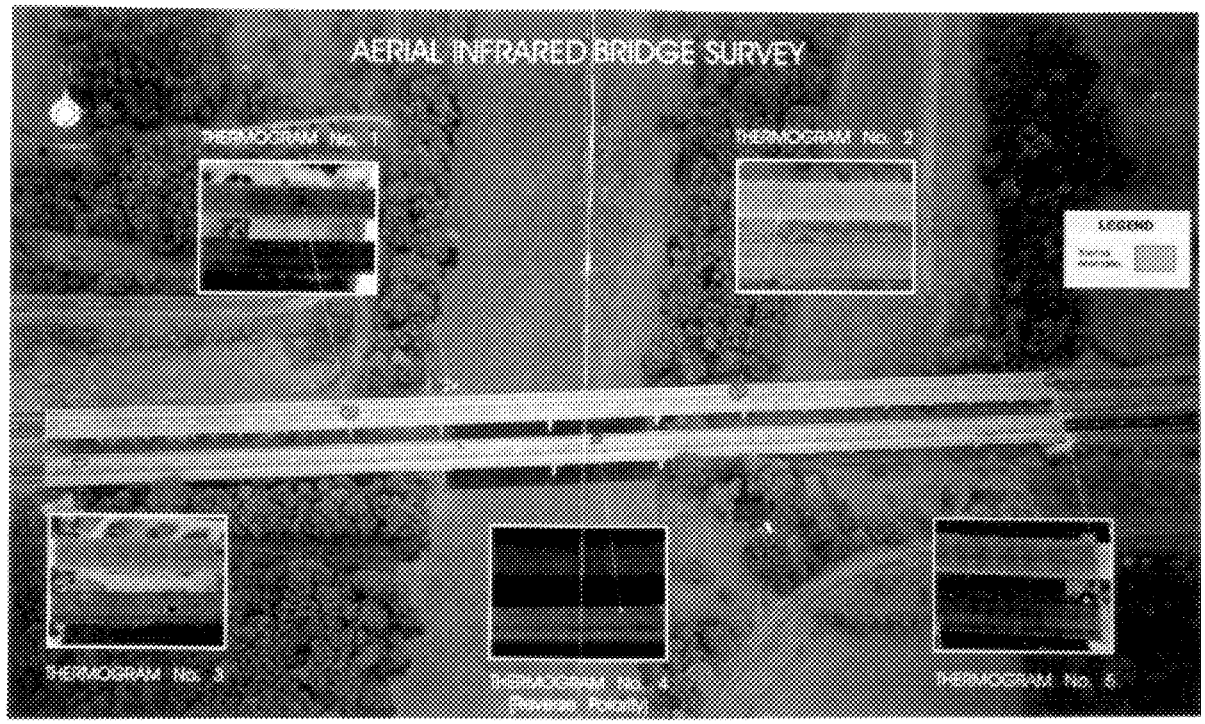
FIG. 13 is an output aerial bridge delamination survey in image accordance with the present invention.

FIG. 13 is a sample output thermographic concrete structure delamination survey image. The thermal anomaly areas are indicated also by cross-hatching. Also readily seen are enlarged thermograms of the specific anomaly areas. Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for generating an output thermographic survey image using a processor and a display screen operatively connected thereto, the method comprising the steps of:

obtaining an aerial thermographic survey image of a survey area;

obtaining an aerial visual image of the survey area;

loading the aerial thermographic survey image and the aerial visual image into the processor;

displaying on the display screen the aerial thermographic survey image superimposed on the aerial visual image;

selectively reducing an opacity of the displayed thermographic survey image to reveal visible features of the underlying displayed visual image; and observing and selectively removing false anomaly thermographic image portions from the displayed thermographic survey image based upon features of the underlying displayed visual image to thereby generate an output thermographic survey image.

2. A method according to claim 1 further comprising the step of printing the output thermographic survey image.

3. A method according to claim 1 wherein the displayed thermographic survey image comprises a plurality of pixels, and further comprising the steps of:

generating an intensity histogram of the plurality of pixels of the displayed thermographic survey image; and defining a threshold to select only pixels having an intensity above the threshold to be displayed on the display screen.

4. A method according to claim 3 wherein the step of obtaining an aerial thermographic survey image comprises obtaining an aerial thermographic survey image of a building roof for a roof moisture survey; and wherein the step of defining a threshold comprises defining same to identify moisture anomalies in the building roof.

5. A method according to claim 3 wherein the step of obtaining an aerial thermographic survey image comprises obtaining an aerial thermographic survey image of a concrete structure for a concrete delamination survey; and wherein the step of defining a threshold comprises defining same to identify delamination anomalies in the concrete structure.

6. A method according to claim 1 wherein the step of obtaining an aerial thermographic survey image comprises obtaining an aerial thermographic survey image of a building roof for a roof moisture survey; and further comprising the steps of:

conducting roof core sample moisture tests; and adding indicia relating to the core sample moisture tests to the output thermographic survey image.

7. A method according to claim 1 further comprising the steps of obtaining, processing and adding information from a second survey image of a different type to the output thermographic survey image.

8. A method according to claim 7 wherein the second survey image is based upon one of surface penetrating radar sensing, and nuclear moisture sensing.

9. A method according to claim 1 wherein the step of displaying comprises the steps of:
observing and relatively scaling the displayed aerial thermographic survey image and the displayed aerial visual image to be a same scale on the display screen; and
aligning the scaled displayed aerial thermographic survey image and the scaled displayed visual image to be in registry with one another.

10. A method according to claim 9 wherein the step of aligning comprises selecting corresponding points on the scaled displayed thermographic survey image and the scaled displayed visual image and repositioning the selected points to overlie one another.

11. A method according to claim 1 further comprising the step of converting the aerial thermographic survey image and the aerial visual image into respective image data.

12. A method according to claim 1 further comprising the step of inverting the displayed thermographic survey image.

13. A method according to claim 1 further comprising the step of adding color to the displayed thermographic survey image.

14. A method according to claim 1 wherein the step of obtaining a visual image of the survey area comprises the step of taking an aerial photograph of the survey area.

15. A method according to claim 14 further comprising the step of converting the aerial photograph of the survey area into digital format and storing same on a CDROM.

16. A method according to claim 1 wherein the step of obtaining a visual image of the survey area comprises the step of obtaining a plan view drawing of the survey area.

17. A method according to claim 1 wherein the step of obtaining a thermographic survey image of the survey area comprises the step of taking an aerial forward looking infrared radar (FLIR) videotape of the survey area and selecting a frame from the videotape at a substantially vertical relationship to the survey area.

18. A method according to claim 1 further comprising the step of adding indicia to the output thermographic survey image.

19. A method for generating an output building roof moisture survey image using a processor and a display screen operatively connected thereto, the method comprising the steps of:
obtaining an aerial thermographic survey image of a building roof defining a survey area;
obtaining an aerial visual image of the survey area;
loading the aerial thermographic survey image and the aerial visual image into the processor;
displaying on the display screen the aerial thermographic survey image superimposed on the aerial visual image;
processing the displayed thermographic survey image to generate an output building roof moisture survey image;
selectively reducing an opacity of the displayed thermographic survey image to reveal visible features of the underlying displayed visual image; and
observing and selectively removing false anomaly thermographic image portions from the displayed thermographic survey image based upon features of the underlying displayed visual image to thereby generate the output building roof moisture survey image.

20. A method according to claim 19 further comprising the step of printing the output building roof moisture survey image.

21. A method according to claim 19 wherein the displayed thermographic survey image comprises a plurality of pixels, and where the step of processing further comprises:
generating an intensity histogram of the plurality of pixels of the displayed thermographic survey image; and
defining a threshold to select only pixels having an intensity above the threshold to be displayed on the display screen representative of moisture anomalies in the building roof.

22. A method according to claim 19 further comprising the steps of:
conducting roof core sample moisture tests; and
adding indicia relating to the core sample moisture tests to the output building roof moisture survey image.

23. A method according to claim 19 further comprising the steps of obtaining, processing and adding information from a second survey image of a different type to the output building roof moisture survey image.

24. A method according to claim 23 wherein the second survey image is based upon nuclear moisture sensing.

25. A method according to claim 19 wherein the step of processing further comprises inverting the displayed thermographic survey image.

26. A method according to claim 19 wherein the step of processing further comprises adding color to the displayed thermographic survey image.

27. A method according to claim 19 wherein the step of obtaining a visual image of the survey area comprises the step of taking an aerial photograph of the survey area.

28. A method according to claim 19 further comprising the step of adding indicia to the output building roof moisture survey image.

29. A method for generating an output concrete structure delamination survey image using a processor and a display screen operatively connected thereto, the method comprising the steps of:
obtaining an aerial thermographic survey image of a concrete structure defining a survey area;
obtaining an aerial visual image of the survey area;
loading the aerial thermographic survey image and the aerial visual image into the processor;
displaying on the display screen the aerial thermographic survey image superimposed on the aerial visual image;
processing the displayed thermographic survey image to generate an output concrete structure delamination survey image;
selectively reducing an opacity of the displayed thermographic survey image to reveal visible features of the underlying displayed visual image; and
observing and selectively removing false anomaly thermographic image portions from the displayed thermographic survey image based upon features of the underlying displayed visual image to thereby generate the output concrete structure delamination survey image.

30. A method according to claim 29 further comprising the step of printing the output concrete structure delamination survey image.

31. A method according to claim 29 wherein the displayed thermographic survey image comprises a plurality of pixels, and wherein the step of processing further comprises:

generating an intensity histogram of the plurality of pixels of the displayed thermographic survey image; and defining a threshold to select only pixels having an intensity above the threshold to be displayed on the display screen representative of delamination anomalies in the concrete structure.

32. A method according to claim 29 further comprising the steps of obtaining, processing and adding information from a second survey image of a different type to the output concrete structure delamination survey image.

33. A method according to claim 29 wherein the step of processing further comprises adding color to the displayed thermographic survey image.

34. A method according to claim 29 wherein the step of obtaining a visual image of the survey area comprises the step of taking an aerial photograph of the survey area.

35. A method according to claim 29 further comprising the step of adding indicia to the output concrete structure survey image.

36. An apparatus for generating an output thermographic survey image comprising:

a processor and a display screen operatively connected thereto, said processor comprising loading means for loading the aerial thermographic survey image and the aerial visual image;

displaying means for displaying on the display screen the aerial thermographic survey image superimposed on the aerial visual image;

opacity control means for permitting selectively reducing an opacity of the displayed thermographic survey image to reveal visible features of the underlying displayed visual image; and edit means for permitting selectively removing false anomaly thermographic image portions from the displayed thermographic survey image based upon features of the underlying displayed visual image to thereby generate an output thermographic survey image.

37. An apparatus according to claim 36 wherein said displaying means comprises means for displaying the thermographic survey image as a plurality of pixels; and further comprising threshold means for generating an intensity histogram of the plurality of pixels of the displayed thermographic survey image and permitting selection of a threshold to select only pixels having an intensity above the threshold to be displayed on the display screen.

38. An apparatus according to claim 36 further comprising survey adding means for processing and adding information from a second survey image of a different type to the output thermographic survey image.

39. An apparatus according to claim 36 further comprising indicia adding means for permitting adding indicia to the output thermographic survey image.

* * * * *